3,238,018
MAKING ARTICLES OF ALUMINUM NITRIDE
Lionel Winter, Mitcham, and Aidan O'Hanlon, London, England, assignors to Morganite Research and Development Limited, London, England
No Drawing. Filed July 6, 1962, Ser. No. 208,118
Claims priority, application Great Britain, July 21, 1961, 26,475/61
4 Claims. (Cl. 23—192)

This invention relates to making articles of aluminum nitride.

Aluminum nitride has excellent refractory and other properties which make it an attractive material for making articles, such as crucibles, nozzles and troughs, required to withstand very high temperatures, as encountered, for example, in the melting and handling of non-ferrous metals, especially aluminum.

The production of aluminum nitride, by known methods, results in the material being available as a powder obtained by crushing and grinding lump or mass material formed by the reaction of aluminum metal with nitrogen.

The usual method of making ceramic articles from powder material, by moulding the material with or without a temporary binder and sintering, is not really practicable for aluminum nitride because aluminum nitride powder, synthesized at a high temperature of about 2000° C. in order to produce a pure, non-reactive, compound, is very difficult to cold press satisfactorily.

In looking for an alternative method, the possibility of making an article from aluminum and then converting it to aluminum nitride may be considered, such a method having already been proposed for making silicon nitride articles, but aluminum has the relatively low melting point of 660° C. and consequently it could not be expected that the aluminum article could maintain its shape at the much higher temperatures involved in the very exothermic conversion of aluminum to aluminum nitride.

We have however devised a method which enables an article formed substantially from aluminum to be converted, without loss of shape, to aluminum nitride.

According to the invention, a method of making an article of aluminum nitride comprises making a form of the article from powder of which at least 50% is aluminum metal-powder and heating the form in a nitrogenous atmosphere and in the presence of a catalyst for the conversion of aluminum into aluminum nitride, the heating being effected in stages such that the temperature of the form does not reach 660° C. before sufficient aluminum nitride has been produced in the form to maintain the shape thereof during subsequent heating substantially to complete conversion of the aluminum into aluminum nitride.

The nitrogenous atmosphere may be provided by exposing the form to pure nitrogen gas or to ammonia or other gas having a nitrogen content.

By "powder" is meant material in particles of such size and character that they can be caused, by known powder metallurgical techniques, to cohere and by "form" is meant a coherent body of the powder having substantially the shape and dimensions of the article to be made.

In carrying out the invention, the powder used for the form may be entirely aluminum metal-powder or up to about 50% of aluminum nitride powder may be used therewith.

By any suitable powder-metallurgy technique, the powder is compacted and formed to the desired article shape and size and the form is then heated, with controlled raising of the temperature, in a nitrogenous atmosphere and in the presence of a catalyst such as is known to enable the otherwise highly exothermic reaction between aluminum and nitrogen to take place at a lower temperature.

The catalyst is preferably lithium fluoride but other fluorides may be used, such as of aluminum, barium, calcium, magnesium, potassium and sodium.

The catalyst may be present in the form itself, having been admixed dry with the component powder or impregnated in saturated solution into the form, or vapour of the catalyst may be introduced into the nitrogenous atmosphere in which the form is heated.

In order to ensure that the form will be stabilised by a sufficient content of aluminum nitride in its component material before the melting point of aluminum (660° C.) is reached, the heating is carried out in gradual and diminishing stages of increase in temperature until a temperature of 660° C. has been safely passed and then, say from 700° C. upwards, the heating is continued in stages, which may have a greater rate of increase, up to a substantially higher temperature, say about 1100–1450° C.

During the above-stated heating steps, small surface excrescences usually appear on the form and these should preferably be removed. This can easily be done if heating is interrupted, at say 1100–1450° C. as mentioned above, and the form allowed to cool before removal of the excrescences by surface scraping or moderate abrasion.

The cleaned form can then again be heated in a nitrogenous atmosphere up to 1550–2000° C., preferably 1600–1800° C., to complete the conversion of its material to aluminum nitride.

The re-heated and finally cooled article is found to have an aluminum nitride content as high as 98–99% and is more resistant to moisture or chemical attack than a similar article which has not been re-heated to the higher temperature.

Specific examples of the making of small crucibles according to the invention are as follows:

*Example 1*

A mix containing 80 parts by weight of aluminum powder of mesh size through 100 B.S.S., 20 parts of aluminum nitride powder and one part of lithium fluoride powder was dry blended and pressed to the forms of crucibles 1″ diameter, 1½″ high and 1/16″ wall thickness. The crucible forms were placed in a furnace and heated to 1450° C. in a stream of pure nitrogen according to the following schedule:

Up to 300° C. at 100°/hr.
300–600° C. at 50°/hr.
600–700° C. at 25°/hr.
700–900° C. at 50°/hr.
900–1450° C. at 100°/hr.

After cooling, any surface excrescences were removed and the crucibles were then fired to 1800° C. at 100° C./hr. in nitrogen. The resulting crucibles were found to be hard and well bonded and analysis showed the material to be 98.4% aluminum nitride.

*Example 2*

Crucible forms of the same size as in Example 1 were pressed from 100–300 mesh B.S.S. aluminum powder and heated in a furnace in a stream of pure nitrogen in which fluorine-containing vapour was entrained. The heating schedule was as follows:

Up to 600° C. at 300° C./hr.

Then at:
    630° C. for ¾ hr.
    640° C. for 1½ hr.
    650° C. for 1 hr.
    670° C. for 1 hr.
    680° C. for 1 hr.
    730° C. for 1 hr.
    800° C. for 1 hr.
    830° C. for 1 hr.
    920° C. for 1 hr.
    1080° C. for 1 hr.

The crucibles were then cooled and any surface excrescences removed before refiring in nitrogen up to 1600° C. at 100° C./hr.

*Example 3*

Crucible forms of the same size as in Example 1 were pressed from 100–300 mesh B.S.S. aluminum powder, were soaked for 24 hrs. in a saturated solution of aluminum fluoride and were then dried under gentle heat. The forms were heated in a furnace in a stream of pure nitrogen at similar rate to that of Example 2, followed by removal of surface excrescences, and refired in nitrogen up to 1600° C. at 100° C./hr.

We claim:

1. A method of making an article of aluminum nitride which comprises the steps of pressing aluminum powder into the form of a coherent body of the powder, said body having substantially the shape and dimensions of the article to be made, gradually heating said body in a nitrogenous atmosphere until a temperature of 660° C. is passed, said heating being effected in the presence of an inorganic metal fluoride selected from the group consisting of the fluorides of aluminum, barium, calcium, lithium, magnesium, potassium and sodium, which fluorides are catalysts for the conversion of aluminum to aluminum nitride, said heating further being scheduled in stages at gradually increasing temperatures and of durations ensuring conversion of aluminum to aluminum nitride and stabilisation of said shape and dimensions before said temperature of 660° C. is reached, and then continuing heating of said body at above said temperature of 660° C. until said body consists substantially entirely of aluminum nitride.

2. A method according to claim 1, in which said continued heating at above said temperature of 660° C. is effected in stages scheduled to be at increasing temperatures.

3. A method according to claim 1, in which said continued heating at above said temperature of 660° C. is effected in stages of increasing temperature up to a temperature between 1080° C. and 1450° C., and then the body is cooled, the cooled body is cleaned of surface excrescences, and the body is re-heated to a temperature between 1550° C. and 2000° C.

4. A method of making an article of aluminum nitride which comprises the steps of pressing a powder into the form of a coherent body of the powder, said powder consisting of a mixture of aluminum powder and up to 50% of aluminum nitride powder, and said body having substantially the shape and dimensions of the article to be made, gradually heating said body in a nitrogenous atmosphere until a temperature of 660° C. is passed, said heating being effected in the presence of an inorganic metal fluoride selected from the group consisting of the fluorides of aluminum, barium, calcium, lithium, magnesium, potassium and sodium, which fluorides are catalysts for the conversion of aluminum to aluminum nitride, said heating further being scheduled in stages at gradually increasing temperatures and of durations ensuring conversion of aluminum to aluminum nitride and stabilisation of said shape and dimensions before said temperature of 660° C. is reached, and then continuing heating of said body at above said temperature of 660° C. until said body consists substantially entirely of aluminum nitride.

References Cited by the Examiner

UNITED STATES PATENTS 2,929,126    3/1960    Bollack et al. _____ 23—192 X

FOREIGN PATENTS 1,258,644    3/1961    France.
  784,126    10/1957    Great Britain.

MAURICE A. BRINDISI, *Primary Examiner.*